(12) United States Patent
Baumann et al.

(10) Patent No.: US 11,098,630 B2
(45) Date of Patent: Aug. 24, 2021

(54) METHOD AND COMPUTER PROGRAM PRODUCT FOR DIAGNOSING A PARTICLE FILTER

(71) Applicant: Robert Bosch GmbH, Stuttgart (DE)

(72) Inventors: Thomas Baumann, Kornwestheim (DE); Yunjie Lian, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 16/498,221

(22) PCT Filed: Mar. 22, 2018

(86) PCT No.: PCT/EP2018/057356
§ 371 (c)(1),
(2) Date: Sep. 26, 2019

(87) PCT Pub. No.: WO2018/177897
PCT Pub. Date: Oct. 4, 2018

(65) Prior Publication Data
US 2021/0102487 A1   Apr. 8, 2021

(30) Foreign Application Priority Data
Mar. 29, 2017  (DE) ..................... 10 2017 205 361.5

(51) Int. Cl.
*B01D 46/00* (2006.01)
*B01D 46/44* (2006.01)
(Continued)

(52) U.S. Cl.
CPC ........ *F01N 11/002* (2013.01); *B01D 46/0086* (2013.01); *B01D 46/446* (2013.01);
(Continued)

(58) Field of Classification Search
CPC ... B01D 2273/18; F01N 11/005; F01N 11/00; F01N 2900/0418; F01N 2900/1406
See application file for complete search history.

(56) References Cited

FOREIGN PATENT DOCUMENTS

| | | |
|---|---|---|
| CN | 105089757 A | 11/2015 |
| DE | 102007042420 | 1/2009 |

(Continued)

OTHER PUBLICATIONS

English Translation of DE 10 2014 209 840 (Year: 2014).*
(Continued)

*Primary Examiner* — Anthony Ayala Delgado
(74) *Attorney, Agent, or Firm* — Michael Best & Friedrich LLP

(57) ABSTRACT

The invention relates to a method and a computer program product for identifying an absent or defective particle filter in an exhaust gas treatment system of an internal combustion engine, in particular a petrol engine, wherein in order to monitor the particle filter a pressure difference between the inlet and the outlet of the particle filter is measured and evaluated. In that context, it is provided that, depending on the operating parameters of the internal combustion engine and/or of the exhaust gas treatment system, a correlation of the measured pressure difference across the particle filter compared to an expected pressure difference for an intact reference particle filter, or a correlation of the gradient, with respect to time, of the measured pressure difference to an expected gradient, with respect to time, of the expected pressure difference for an intact reference particle filter, is determined, and that, in the event of high correlation it is concluded that a particle filter is present and intact, and in the event of low correlation it is concluded that a particle filter is absent or defective. The method makes it possible to identify an absent or defective particle filter under many (Continued)

operating conditions of the internal combustion engine, even in the case of very low absolute pressure differences, as is in particular the case with petrol particle filters.

12 Claims, 2 Drawing Sheets

(51) Int. Cl.
*B01D 53/94* (2006.01)
*F01N 3/021* (2006.01)
*F01N 3/24* (2006.01)
*F01N 11/00* (2006.01)
*F01N 13/00* (2010.01)

(52) U.S. Cl.
CPC ......... *B01D 53/9477* (2013.01); *F01N 3/021* (2013.01); *F01N 3/24* (2013.01); *F01N 13/008* (2013.01); *B01D 2279/30* (2013.01); *F01N 2370/02* (2013.01); *F01N 2560/08* (2013.01)

(56) References Cited

FOREIGN PATENT DOCUMENTS

| DE | 102010002691 | | 9/2011 | |
|----|----|----|----|----|
| DE | 102010002691 | A1 | 9/2011 | |
| DE | 102014209794 | A1 * | 11/2015 | .............. F01N 11/00 |
| DE | 102014209840 | | 11/2015 | |
| DE | 102014209840 | A1 * | 11/2015 | .............. F01N 11/00 |

OTHER PUBLICATIONS

International Search Report for Application No. PCT/EP2018/057356 dated May 3, 2018 (English Translation, 2 pages).

* cited by examiner

METHOD AND COMPUTER PROGRAM PRODUCT FOR DIAGNOSING A PARTICLE FILTER

BACKGROUND OF THE INVENTION

The invention relates to a method for detecting a removed or defective particle filter in an exhaust gas after-treatment system of an internal combustion engine, in particular of a gasoline engine, wherein in order to monitor the particle filter a differential pressure $\Delta p$ between the inlet and the outlet of the particle filter is measured and evaluated.

The invention also relates to a computer program product for carrying out the method.

Emissions legislation, in particular in the USA and in Europe, stipulates limiting values for the emission of particle mass and also numbers and concentrations of particles for the operation of internal combustion engines. In addition to the emission limiting values, diagnostic limiting values are also specified, the exceeding of which has to trigger the indication of a fault. In a vehicle which is driven by the internal combustion engine, for this purpose diagnostic functions are implemented which monitor the parts and components installed in order to reduce emissions, within the scope of on-board diagnostics (OBD) while the vehicle is operating, and display a malfunction which cause the diagnostic limiting values to be exceeded.

Particle filters are not yet in series-production use in gasoline engines. Owing to the tightened-up legislation regarding emissions, in particular for gasoline direct-injection engines, both measures within the engine and measures for exhaust gas after-treatment are under discussion. Therefore, in the case of gasoline systems, exhaust gas configurations with a three-way catalytic converter in installation position next to the engine and a non-coated gasoline particle filter installed downstream as well as coated particle filters (so-called four-way catalytic converters=three-way catalytic converter+particle filter) in an installation position near to the engine are being examined for their effectiveness and economic viability. In this context it is obvious to use the methods employed in diesel systems to diagnose the particle filter, that is to say to measure the increase in pressure across the particle filter by means of pressure sensors or to measure the particle mass downstream of the particle filter by means of a particle sensor.

The soot particles which are emitted by an engine, in particular a diesel engine, can be removed efficiently from the exhaust gas by means of a diesel particle filter (DPF). At present, a so-called wall-flow diesel particle filter (DPF) is the state of the art. Soot deposition of up to 99% is possible by virtue of its ducts which are closed on one side and its porous filter material. A disadvantage is that the filter has to be thermally regenerated from time to time. In this context, the temperature is varied over a range by means of engine-internal or engine-external measures, and as a result the accumulated soot in the filter is burnt off, since otherwise the exhaust gas counterpressure would rise too much.

DE 10 2010 002 691 A1 discloses, for example, a method and a device for diagnosing a particle filter as part of an exhaust gas purification system in the exhaust train of an internal combustion engine, wherein in order to monitor the particle filter a differential pressure between the inlet and the outlet of the particle filter is measured and is evaluated in a diagnostic unit. In this context there is provision that the differential pressure across the particle filter is determined from two differential pressure measurements or two absolute pressure measurements. The on-board diagnosis can therefore be improved and also it can be detected whether the particle filter has been tampered with or even removed.

It is problematic with gasoline-operated engines that a significantly lower differential pressure drops at the particle filter than is the case in diesel vehicles. The cause of this is the significantly lower exhaust gas mass flow in the gasoline engine and the different configuration of the particle filter owing to the lower raw mass emissions of soot.

The raw emission of the particle mass is higher by an order of magnitude in diesel vehicles than in gasoline engines. The currently valid emission limiting values for the particle mass are generally undershot by gasoline vehicles and therefore the valid diagnostic limiting values are also. The limiting values for the number of particles for the new exhaust gas regulations according to EU6c are, however, exceeded by some types of vehicle if no additional measures are taken. Since according to the exhaust gas regulation according to EU6b (2014) and EU6c (2017) there is only an emission limiting value and no diagnostic limiting value for the number of particles, it is expected that legislators will demand, in a way analogous to diesel vehicles, that a minimum requirement will be that the removal or complete failure of a particle filter must be detected when the particle-mass and particle-number emission limiting values are exceeded.

DE 10 2014 209 840 A1 discloses the detection of a defective or removed particle filter by forming in each case a time gradient of the measured differential pressure and of an expected differential pressure across the particle filter and determining the correlation between the two gradients. This can be done by means of a cross-correlation. When there is a high correlation between the measured gradient and the expected gradient, an intact particle filter or the presence of a particle filter is inferred, while a defective or uninstalled particle filter is assigned to a low correlation. The method is configured, in particular, for gasoline-operated internal combustion engines. Said method permits, in particular, the monitoring of particle filters in exhaust gas after-treatment systems of gasoline engines, across which only a small pressure difference is built up during operating phases of the gasoline engine.

It is disadvantageous for the method that a certain dynamic excitation, which ultimately leads to a correspondingly fast change in differential pressure across the particle filter, must be present in order to obtain gradients of the differential pressure which can be evaluated. Such dynamic excitation can be caused, for example, by a rapid change in rotational speed of the internal combustion engine. Depending on the mode of operation of the internal combustion engine, for example owing to the driving behavior of a driver of a motor vehicle, operating phases with sufficiently high dynamic excitation may not occur, or only occur rarely. Therefore, continuous monitoring of the particle filter cannot be ensured.

It is therefore an object of the invention to make available a method with which a defective or a removed particle filter can be reliably detected independently of the mode of operation of the internal combustion engine.

Furthermore, it is an object of the invention to make available a computer program product for carrying out the method.

SUMMARY OF THE INVENTION

The object of the invention which relates to the method is achieved in that a correlation of the measured differential pressure $\Delta p$ across the particle filter with an expected differential pressure Δp* is determined for an intact reference particle filter or a correlation of the time gradient d(Δp) of the measured differential pressure Δp with an expected time gradient d(Δp*) of the expected differential pressure Δp* is determined for an intact reference particle filter as a function of the operating parameters of the internal combustion engine and/or of the exhaust gas after-treatment system, and in that when there is a high correlation it is inferred that there is an intact particle filter present, and when there is a low correlation it is inferred that a particle filter has been removed or there is a defective particle filter. The monitoring of the particle filter can therefore be carried out with respect to operating parameters both of the internal combustion engine and of the exhaust gas after-treatment system which bring about a differential pressure Δp which can be evaluated reliably, across the particle filter or a high dynamic excitation and therefore a change in the differential pressure Δp which can be evaluated reliably. Compared to pure evaluation of the time gradient d(Δp) of the differential pressure Δp* there are therefore significantly more operating points of the internal combustion engine and of the exhaust gas after-treatment system available at which it is possible to detect a removed or defective particle filter. For example, in the case of long freeway journeys within an approximately constant speed it is possible to directly evaluate the correlation of the differential pressure Δp with an expected differential pressure Δp*, while the time gradient d(Δp) of the differential pressure Δp during such an operating mode of the internal combustion engine is too low for reliable evaluation owing to the low dynamic excitation. Conversely, for example in the case of a town journey with frequent changes in speed the correlation of the measured time gradient d(Δp) with the expected time gradient d(Δp*) can be used to detect a defective or removed particle filter, while the direct evaluation of the correlation between the measured differential pressure Δp and the expected differential pressure Δp* is not possible owing to the small pressure difference which is built up across the particle filter. The method therefore permits a defective or removed particle filter to be detected during a large number of different operating conditions and therefore independently of the mode of operation of the internal combustion engine which is connected upstream or of the exhaust gas after-treatment system.

Reliable differentiation as to when the correlation of the measured and expected differential pressures Δp, Δp* and when the correlation of the measured and expected time gradients d(Δp), d(Δp*) can be advantageously evaluated can be achieved by virtue of the fact that the correlation of the measured differential pressure Δp across the particle filter with the expected differential pressure Δp* is evaluated in order to detect the removed or defective particle filter when the measured differential pressure Δp and/or the expected differential pressure Δp* and/or an exhaust gas mass flow and/or an exhaust gas volume flow and/or an engine rotational speed and/or a further characteristic variable which is associated with the differential pressure Δp, Δp* exceeds a respectively predefined first threshold, and that the correlation of the time gradient d(Δp) of the measured differential pressure Δp with the expected time gradient d(Δp*) of the expected differential pressure Δp* is evaluated for an intact reference particle filter when if gradient of the measured differential pressure Δp and/or of the expected differential pressure Δp* and/or of an exhaust gas mass flow and/or of an exhaust gas volume flow and/or of an engine rotational speed and/or of a further characteristic variable which is associated with the differential pressure Δp, Δp* exceeds a respectively predefined second threshold. It is therefore possible to determine unambiguously operating situations of the internal combustion engine or of the exhaust gas after-treatment system which permit reliable evaluation of the correlation between the measured and expected differential pressures Δp, Δp* or between the measured and expected time gradients d(Δp), d(Δp*) of the differential pressures Δp, Δp*.

According to one preferred embodiment variant of the invention there can be provision that the expected differential pressure Δp* of the reference particle filter is determined in a model-like fashion as a function of at least one operating parameter of the internal combustion engine and/or of the exhaust gas after-treatment system. The expected time gradient d(Δp*) of the expected differential pressure Δp* can be determined directly from the expected differential pressure Δp*. The methods for modelling the expected differential pressure Δp* are known and can be carried out, for example, in a superordinate engine controller room in which the necessary operating parameter or parameters of the internal combustion engine and/or of the exhaust gas after-treatment system are present.

For this purpose it can be provided that the expected differential pressure Δp* or the expected time gradient d(Δp*) of the expected differential pressure Δp* is calculated at least from an exhaust volume flow and/or from the time gradient of the exhaust gas volume flow and a flow resistance of the intact reference particle filter, and/or that a quadratic component of the volume flow is also taken into account during the calculation of the expected differential pressure Δp* or of the expected time gradient d(Δp*) of the expected differential pressure Δp*, which quadratic component takes into account the compression and expansion of the exhaust gas as the exhaust gas flows into the particle filter and as the exhaust gas flows out of the particle filter. The flow resistance can be stored here as a fixed value in the diagnostic unit or can be stored as a function of one or more parameters in a characteristic diagram memory unit.

In accordance with a simple model, the expected differential pressure Δp can be calculated from the flow resistance A and the exhaust gas volume flow dVol:

$$\Delta p = A * dVol$$

In order to achieve a relatively high model accuracy, it is advantageous to take into account a quadratic component $b*dVol^2$. This partial differential pressure is caused by the compression and expansion of the exhaust gas when the exhaust gas flows into the particle filter or flows out of the particle filter $$\Delta p = A * dVol + b * dVol^2$$

Disruption-induced signal fluctuations can be suppressed by low-pass filtering the measured differential pressure Δp across the particle filter and/or the expected differential pressure Δp* across the reference filter and/or the volume flow in order to determine the expected differential pressure Δp*. The informativeness of the diagnostics is therefore increased.

According to one particularly preferred configuration variant of the invention there can be provision that in order to determine the respective correlation from the measured differential pressure Δp and the expected differential pressure Δp* a first cross-correlation factor $KKF_1$ is formed by means of a cross-correlation, and/or in that a second cross-correlation factor $KKF_2$ is formed from the time gradient d(Δp) of the measured differential pressure d(Δp) across the particle filter and the expected time gradient d(Δp*) of the expected differential pressure Δp* across the reference particle filter by means of a cross-correlation. The standardized cross-correlation factors $KKF_1$, $KKF_2$ which are acquired in this way are independent of the absolute values of the evaluated measured and expected pressure differences Δp, Δp* or of the measured and expected time gradients d(Δp), d(Δp*). They assume low values for an insufficient correlation and high values for a good correlation and are therefore easy to evaluate.

For the purpose of evaluation there may be provision that the first cross-correlation factor $KKF_1$ and/or the second cross-correlation factor $KKF_2$ are each compared with a predefined threshold value, and when the respective threshold value is undershot a faulty particle filter or the absence of a particle filter is detected, and when the respective threshold value is reached or exceeded an installed and intact particle filter is diagnosed. When a standardized cross-correlation is carried out for the evaluation of both the measured and determined differential pressures Δp, Δp* and of the measured and determined time gradients d(Δp), d(Δp*) of the pressure differences Δp, Δp*, the same threshold value can advantageously be provided for both evaluations.

Reliable determination of the measured differential pressure Δp and/or of the time gradient d(Δp*) of the measured differential pressure Δp can be carried out by virtue of the fact that the differential pressure Δp and/or the time gradient d(Δp) of the measured differential pressure Δp are/is determined from the signal of a differential pressure sensor which is arranged above the particle filter or from the signals of two differential pressure sensors or of two absolute pressure sensors which are arranged downstream and upstream of the particle filter in the exhaust train, or from the difference between a measured absolute pressure at the inlet of the particle filter and a modelled absolute pressure of the outlet of the particle filter or from the difference between a measured relative pressure at the inlet of the particle filter relative to the surroundings and a modelled relative pressure at the outlet of the particle filter relative to the surroundings. The method is therefore based on the use of parts which are already provided in any case in modern exhaust gas after-treatment systems and can be correspondingly implemented in a cost-effective way.

The method can preferably be applied in a gasoline-operated internal combustion engine in which the exhaust gas system has at least one separate catalytic converter and one particle filter or a catalytic-particle filter combination or a catalytic coated particle filter.

The object of the invention is also achieved by means of a computer program product which can be loaded directly into the internal memory of a digital computer and comprises software code sections are executed when the product runs on a computer. The digital computer is preferably part of a control unit, in particular of a superordinate engine controller which comprises at least one processor, one computer-readable storage medium and input units and output units. The computer program product is formed by a corresponding computer program which is stored on the computer-readable storage medium and can be executed by the computer.

BRIEF DESCRIPTION OF THE DRAWINGS

The invention will be explained in more detail below by means of an exemplary embodiment illustrated in the figures. In the drawing.

DETAILED DESCRIPTION

Figure 1:
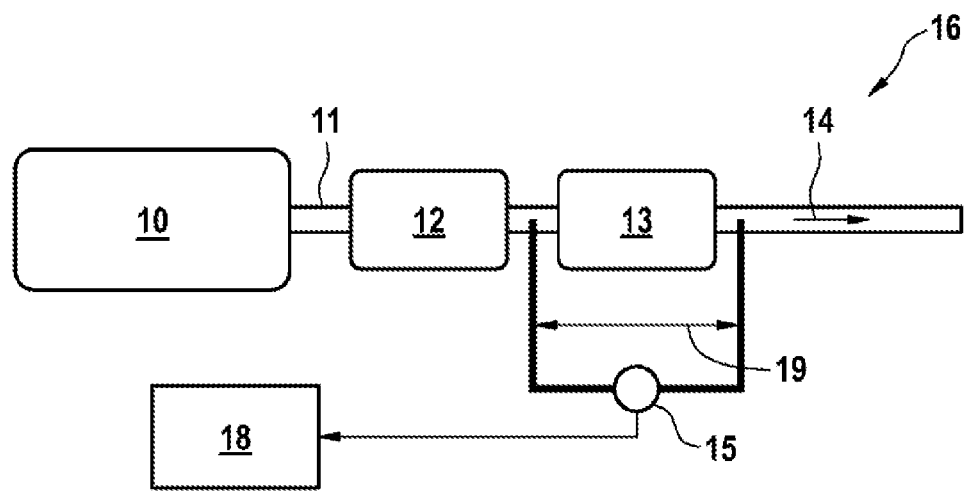
FIG. 1 shows by way of example a technical environment in which the invention can be used.

FIG. 1 shows a schematic view of the technical environment in which the invention can be used. For example an internal combustion engine 10 with an exhaust gas after-treatment system 16 is illustrated. The internal combustion engine 10 is embodied as a gasoline engine. The exhaust gas of the internal combustion engine 10 is conducted away via an exhaust train 11. The exhaust gas after-treatment system 16, which is embodied in multiple stages in the exemplary embodiment shown, is arranged along the exhaust train 11. Viewed in the direction of flow of the exhaust gas (exhaust gas flow 14), firstly a catalytic converter 12 is provided, embodied here as a three-way catalytic converter. The catalytic converter 12 has a particle filter 13 connected downstream of it. In the selected basic illustration, the exhaust gas after-treatment system 16 has further components (not shown), such as exhaust gas probes and further sensors whose signals are fed to an engine controller (electronic control unit, ECU).

In order to diagnose the particle filter 13, a differential pressure sensor 15 is provided by virtue of which the pressure difference (differential pressure 19) between a filter input and a filter output of the particle filter 13 can be determined. The output signal of the differential pressure sensor 15 is fed to a diagnostic unit 18 in which a diagnosis relating to a possibly broken, removed or blocked particle filter 13 can be carried out by means of on-board diagnostics (OBD). This diagnostic unit 18 can be part of the superordinate engine controller (ECU).

The catalytic converter 12 and the particle filter 13 can also be connected together in the form of a four-way catalytic converter (FWC), that is to say a catalytically coated particle filter 13. It is also conceivable to determine the differential pressure 19 by means of two absolute pressure sensors which are arranged upstream and downstream of the particle filter 13. It is also possible to provide a differential pressure sensor respectively upstream and downstream of the particle filter 13, which differential sensors respectively measure the pressure in the exhaust train 11 in comparison with the ambient pressure. The differential pressure can also be determined from the difference between a measured absolute pressure at the inlet of the particle filter 13 and a modelled absolute pressure at the outlet of the particle filter 13. It is also conceivable to form the differential pressure from the difference between a measured relative pressure at the inlet of the particle filter 13 in comparison with the surroundings a modelled relative pressure at the outlet of the particle filter 13 in comparison with the surroundings.

Figure 2:
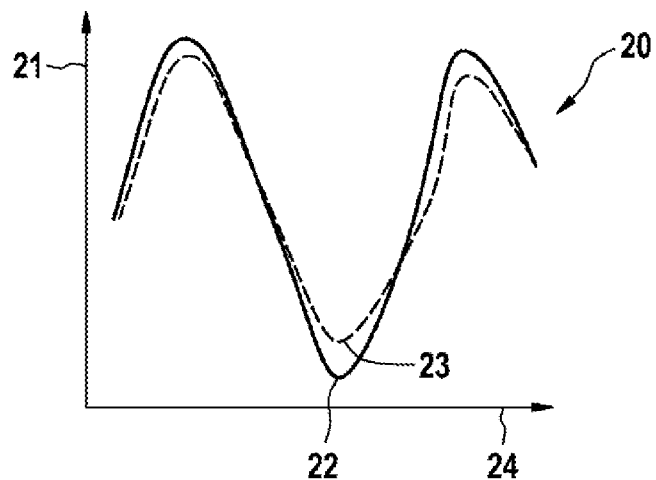
FIG. 2 shows a first schematic profile diagram of the differential pressure profiles for a measured reference differential pressure and a reference differential pressure which is determined by model, for an intact particle filter.
Figure 3:
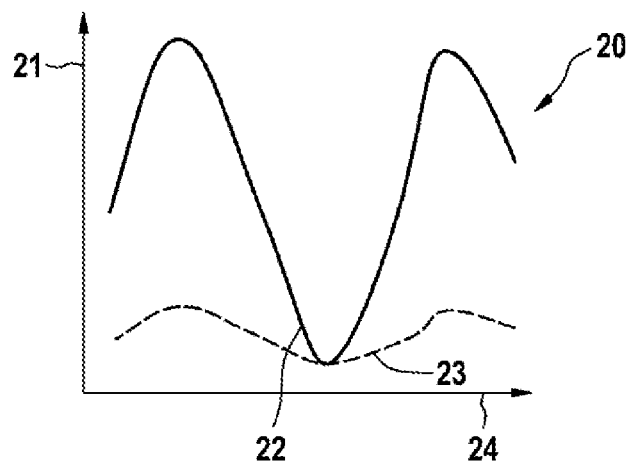
FIG. 3 shows a second schematic profile diagram of the differential pressure profiles for the measured reference differential pressure and the reference differential pressure which is determined by means of a model, for a removed or defective particle filter.

FIG. 2 and FIG. 3 each comprise schematic profile diagrams 20 of the differential pressure signals 21 for differential pressure profiles 22, 23 for a measured differential pressure Δp (measured differential pressure profile 23) and an expected differential pressure Δp* which is determined by means of a model (expected differential pressure profile 22) as a function of the time 24. The measured differential pressure Δp and therefore the measured differential pressure profile 23 are measured using the differential pressure sensor 15 shown in FIG. 1. The expected differential pressure Δp* and the time profile thereof are calculated from the absolute gas volume flow and the flow resistance of an intact reference particle filter.

FIG. 2 shows by way of example the differential pressure profiles 22, 23 for an intact and installed particle filter 13. It is characteristic here that only small differences in signal level and phase differences occur between the modelled differential pressure profile 22 and the measured differential pressure profile 23. There is therefore a high degree of correlation between the two differential pressure profiles 22, 23. This relates to the absolute values of both the measured and expected differential pressure Δp, Δp* 19 as well as the time derivatives thereof.

In contrast to FIG. 2, FIG. 3 shows, in the further profile diagram 20, the differential pressure profiles 22, 23 for the measured differential pressure Δp 19 and the expected differential pressure Δp* in the case of a removed or defective particle filter 13. Significant deviations in respect of the signal level and/or in respect of the phase occur between the differential pressure profiles 22, 23. There is therefore low correlation between the two differential pressure profiles 22, 23. The absolute values of both the measured and of the expected differential pressure Δp, Δp* 19 as well as the time derivatives thereof are affected by this.

The inventive detection of a removed or defective particle filter 13, in particular gasoline particle filter, is based on the determination of the correlation of the measured differential pressure Δp 19 or of the time gradient d(Δp) of the measured differential pressure Δp 19 across the particle filter 13 with the expected differential pressure Δp or the expected time gradient d(Δp*) of the expected differential pressure Δp across an intact particle filter 13. The expected differential pressure Δp* and the expected time gradient d(Δp*) of the expected differential pressure Δp* are determined here from a model as a function of current operating variables of the internal combustion engine 10 and/or of the exhaust gas after-treatment system 16.

If the particle filter 13 is installed correctly in the exhaust train 11, there is either a good correlation between the differential pressure Δp measured in a current measurement and the expected differential pressure Δp*, or in the case of dynamic excitation there is a good correlation between the measured time gradient d(Δp) of the measured differential pressure Δp 19 for the current measurement and the expected time gradient d(Δp*) of the expected differential pressure Δp*. If the particle filter 13 is, on the other hand, removed or defective, in each case there is a very weak correlation. Removal of the particle filter 13 or a defect therein can therefore be unambiguously detected.

One advantage of this method is that, on the one hand, it evaluates, in contrast to known differential-pressure-based methods, not only the absolute pressure difference across the particle filter 13 but also the change therein over time. Therefore, even in the case of very low absolute pressure differences 19, it is possible to detect a removed or defective particle filter 13. The diagnostic method is robust here against offset tolerances of the differential pressure sensor 15. These offset tolerances impede all diagnostic methods which are based only on the absolute differential pressure. If there is sufficiently large measured differential pressures Δp and expected differential pressures Δp* 19 for which the offset tolerances of the predefined differential pressure sensor 15 are negligible, the removal of the particle filter 13 or the defect therein can be detected, in comparison, in a faster and more stable fashion by evaluating the correlation between the measured differential pressure Δp 19 and the differential pressure Δp* which is expected across an intact particle filter 13.

The measured differential pressure signal $\Delta p_{(k)}$ is firstly low-pass filtered in order to suppress the noise. Subsequently, the time gradient $d(\Delta p_{(K)})/dk$ of the filtered differential pressure signal $\Delta p_{(K)}$ is determined, where k signifies the k-th measurement. In parallel with this, corresponding reference values for the expected differential pressure signal $\Delta p^*_{(k)}$ and/or the expected time gradient $d(\Delta p^*_{(k)})/dk$ of the expected differential pressure signal $\Delta p^*_{(k)}$ are determined. For this purpose, a time profile of the expected differential pressure signal $\Delta p^*_{(k)}$ or the time profile of the expected time gradient $d(\Delta p^*_{(k)})/dk$ of the expected differential pressure signal $\Delta p^*_{(k)}$ across an intact and installed particle filter 13 is calculated from an exhaust gas volume flow or from the time gradient thereof and the flow resistance of the intact particle filter 13, the reference filter. The expected values or the volume flow which is included in the determination of the expected values can optionally also be low-pass filtered.

The expected differential pressure Δp can be calculated from the flow resistance A of the particle filter 13 and the exhaust gas volume flow dVol:

$$\Delta p = A * d\text{Vol}$$

In order to achieve a higher model accuracy it is advantageous to take into account a quadratic component $b*d\text{Vol}^2$. This partial differential pressure is caused by the compression and expansion of the exhaust gas when the exhaust gas flows into the particle filter or out of the particle filter.

$$\Delta p = A * d\text{Vol} + b * d\text{Vol}^2$$

In a subsequent step, it is determined, in each case by means of a standardized cross-correlation, to what extent the profile of the measured differential pressure signal $\Delta p_{(k)}$ corresponds to that of the expected differential pressure signal $\Delta p^*_{(k)}$ and to what extent the profile of the measured time gradient $d(\Delta p_{(k)})$ corresponds to the profile of the expected time gradient $d(\Delta p^*_{(k)})$. For this purpose, in each case a cross-correlation factor KKF is formed according to the following relationship:

$$KKF_1 = \Sigma(\Delta p_{(k)} * \Delta p^*_{(k)}) / \Sigma(\Delta p^*_{(k)} * \Delta p^*_{(k)}) \quad (1)$$

$$KKF_2 = \Sigma(d(\Delta p_{(k)}) * d(\Delta p^*_{(k)})) / \Sigma(d(\Delta p^*_{(k)}) * d(\Delta p^*_{(k)})) \quad (2)$$

Where:

$\Delta p_{(k)}$: signifies measured values of the measured differential pressure Δp 19

$\Delta p^*_{(k)}$: signifies calculated values of the expected differential pressure Δp*

$d(\Delta p_{(k)})$: signifies measured values of the measured gradient d(Δp) of the measured differential pressure Δp 19, and $d(\Delta p^*_{(k)})$: signifies calculated values of the expected gradient d(Δp*) of the expected differential pressure Δp*.

In order to assess whether the particle filter 13 is correctly provided or installed and is functioning correctly, the respective output value of the standardized cross-correlation, the first cross-correlation factor $KKF_1$ or the second cross-correlation factor $KKF_2$ is compared with a previously defined threshold value which is stored in the control unit or in the diagnostic unit 18. If the result is below the threshold value, which corresponds to an only low correlation or even to no correlation at all, the particle filter 13 is removed or defective. If the result is above the threshold value, which corresponds to a good correlation, the particle filter 13 is present and intact.

Figure 4:
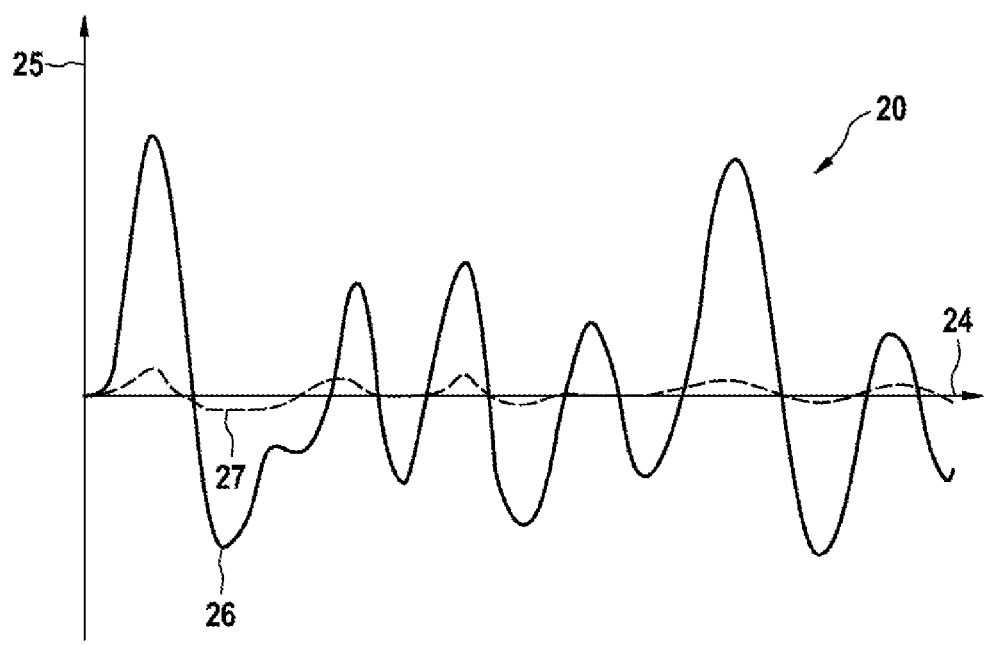
FIG. 4 shows a third schematic profile diagram of the gradients of the differential pressure profiles for the measured reference differential pressure and the reference differential pressure which is determined by means of a model, for a removed or defective particle filter.

FIG. 4 shows third schematic profile diagram 20 of the differential pressure gradient signals 25 as a function of the time 24. For this purpose, the differential pressure gradient profiles 26, 27 are plotted for the measured differential pressure $\Delta p$ and for the expected differential pressure $\Delta p^*$ 19 which is determined by means of a model. The measured differential pressure gradient profile 27, which is formed from the measured differential pressure $\Delta p$ 19, deviates significantly from the expected differential pressure gradient profile 26 such as has been determined for an intact particle filter 13. In this context, a high dynamic excitation is present, which is apparent in the form of the high signal deflections of the expected differential pressure gradient profile 26. The second cross-correlation factor $KKF_2$ will input correspondingly small values which lie below the predefined threshold value. Therefore, in the case of signal profiles according to FIG. 4 it is possible to assume a defective or removed particle filter 13.

The evaluation about the absolute measured differential pressures $\Delta p$ and expected differential pressures $\Delta p^*$ 19, that is to say about the first cross-correlation factor $KKF_1$, occurs reliably if the absolute expected differential pressure $\Delta p^*$ across the intact particle filter 13 exceeds a predefined threshold. The evaluation about the measured time gradients $d(\Delta p)$ and the expected time gradients $d(\Delta p^*)$ occurs reliably if a certain dynamic excitation is present, i.e. if the differential pressure gradients 26, 27 exceed a certain amount. Therefore, an evaluation about the second cross-correlation factor $KKF_2$ occurs only when specific dynamic criteria are satisfied. The gradients of the exhaust gas mass flow, of the exhaust gas volume flow, of the rotational speed or of variables derived therefrom are possible for this. Ideally, the gradient of the differential pressure reference value is also used directly. The evaluation about the first cross-correlation factor $KKF_1$ occurs when sufficiently large measured differential pressures $\Delta p$ and/or expected differential pressures $\Delta p^*$ are present across the particle filter 13. Therefore, both in high dynamic travel situations and in operating situations which cause high exhaust gas mass flows and therefore high differential pressures $\Delta p$ across the particle filter 13, a defective or removed particle filter 13 can be reliably detected.

In one advantageous configuration, the diagnostic method is stored as software in the diagnostic unit 18 and can be used, in particular, in gasoline engines with future gasoline particle filters, but basically also in diesel engines with diesel particle filters.

The invention claimed is:

1. A method for detecting a removed or defective particle filter (13) in an exhaust gas after-treatment system (16) of an internal combustion engine (10),
   wherein in order to monitor the particle filter (13) a differential pressure $\Delta p$ (19) between the inlet and the outlet of the particle filter (13) is measured and evaluated,
   wherein a correlation of the measured differential pressure $\Delta p$ (19) across the particle filter (13) with an expected differential pressure $\Delta p^*$ is evaluated for an intact reference particle filter when at least one of a group consisting of the measured differential pressure $\Delta p$ (19), the expected differential pressure $\Delta p^*$, and a first characteristic associated with the measured or expected differential pressure $\Delta p$, $\Delta p^*$ (19), exceed a respectively predefined first threshold value,
   a correlation of the time gradient $d(\Delta p)$ of the measured differential pressure $\Delta p$ (19) with an expected time gradient $d(\Delta p^*)$ of the expected differential pressure $\Delta p^*$ for an intact reference particle filter is evaluated when at least one of a group consisting of the gradient of the measured differential pressure $\Delta p$ (19), the expected time gradient $d(\Delta p^*)$, and a further characteristic variable which is associated with the differential pressure $\Delta p$, $\Delta p^*$ (19), exceed a respectively predefined second threshold value,
   when a high correlation is evaluated for the time gradient or for the differential pressure, the intact particle filter (13) is present and operating, and when a low correlation is evaluated for the time gradient or for the differential pressure, the particle filter (13) has been removed or is defective.

2. The method as claimed in claim 1, wherein the expected differential pressure $\Delta p^*$ of the reference particle filter is determined in a model-like fashion as a function of at least one operating parameter of the internal combustion engine (10), an operating parameter of the exhaust gas after-treatment system (16), or both.

3. The method as claimed in claim 1, wherein the expected differential pressure $\Delta p^*$ or the expected time gradient $d(\Delta p^*)$ of the expected differential pressure $\Delta p^*$ is calculated from at least one selected from the group consisting of an exhaust volume flow, the time gradient of the exhaust gas volume flow, and a flow resistance of the intact reference particle filter, and in that a quadratic component of the volume flow is also taken into account during the calculation of the expected differential pressure $\Delta p^*$ or of the expected time gradient $d(\Delta p^*)$ of the expected differential pressure $\Delta p^*$, which quadratic component takes into account the compression and expansion of the exhaust gas as the exhaust gas flows into the particle filter (13) and as the exhaust gas flows out of the particle filter (13).

4. The method as claimed in claim 1, wherein the measured differential pressure $\Delta p$ (19) across the particle filter (13), the expected differential pressure $\Delta p^*$ across the reference particle filter, the volume flow, or a combination of the same are low-pass filtered in order to determine the expected differential pressure $\Delta p^*$.

5. The method as claimed in claim 1, wherein in order to determine the respective correlation from the measured differential pressure $\Delta p$ (19) and the expected differential pressure $\Delta p^*$ a first cross-correlation factor $KKF_1$ is formed by means of a cross-correlation, and in that a second cross-correlation factor $KKF_2$ is formed from the time gradient $d(\Delta p)$ of the measured differential pressure $d(\Delta p)$ (19) across the particle filter (13) and the expected time gradient $d(\Delta p^*)$ of the expected differential pressure $\Delta p^*$ across the reference particle filter by means of a cross-correlation.

6. The method as claimed in claim 5, wherein the first cross-correlation factor $KKF_1$, the second cross-correlation factor $KKF_2$, or both are each compared with a predefined threshold value, and when the respective threshold value is undershot a faulty particle filter (13) or the absence of a particle filter (13) is detected, and when the respective threshold value is reached or exceeded an installed and intact particle filter (13) is diagnosed.

7. The method as claimed in claim 1, wherein the differential pressure $\Delta p$ (19), the time gradient $d(\Delta p)$ of the measured differential pressure $\Delta p$ (19), or both are determined from the signal of a differential pressure sensor (15) which is arranged above the particle filter (13) or from the signals of two differential pressure sensors or of two absolute pressure sensors which are arranged downstream and upstream of the particle filter (13) in the exhaust train (11), or from the difference between a measured absolute pressure at the inlet of the particle filter (13) and a modelled absolute pressure of the outlet of the particle filter (13) or from the difference between a measured relative pressure at the inlet of the particle filter (13) relative to the surroundings and a modelled relative pressure at the outlet of the particle filter (13) relative to the surroundings.

8. A vehicle for performing the method as claimed in claim 1, wherein the internal combustion engine is a gasoline-operated internal combustion engine (10) in which the exhaust gas system has at least one separate catalytic converter (12) and one of the particle filter (13) or a catalytic converter-particle filter combination or a catalytically coated particle filter (13).

9. A computer program containing instructions that when retrieved from a non-transitory computer readable medium and executed by a processor cause the processor to carry out the method claimed in claim 1.

10. The method as claimed in claim 1, wherein the particle filter (13) is continuously monitored.

11. A method for detecting a removed or defective particle filter (13) in an exhaust gas after-treatment system (16) of an internal combustion engine (10) by monitoring the particle filter (13), the method comprising:

measuring a differential pressure $\Delta p$ (19) between an inlet and an outlet of the particle filter (13), correlating the measured differential pressure $\Delta p$ (19) across the particle filter (13) with an expected differential pressure $\Delta p^*$ is evaluated for an intact reference particle filter when at least one of a group consisting of the measured differential pressure $\Delta p$ (19), the expected differential pressure $\Delta p^*$, and a first characteristic associated with the measured or expected differential pressure $\Delta p$, $\Delta p^*$ (19) exceed a respectively predefined first threshold value, correlating a time gradient $d(\Delta p)$ of the measured differential pressure $\Delta p$ (19) with an expected time gradient $d(\Delta p^*)$ of the expected differential pressure $\Delta p^*$ for an intact reference particle filter when at least one of a group consisting of the gradient of the measured differential pressure $\Delta p$ (19), the expected time gradient $d(\Delta p^*)$, and a further characteristic variable which is associated with the differential pressure $\Delta p$, $\Delta p^*$ (19), exceed a respectively predefined second threshold value, when a high correlation is evaluated for the time gradient and/or for the differential pressure, the particle filter (13) is present and operating, and when there is a low correlation for the time gradient and/or for the differential pressure, an indication is provided that the particle filter (13) has been removed or that the particle filter (13) is defective.

12. The method as claimed in claim 11, wherein the particle filter (13) is continuously monitored.

* * * * *